Patented Oct. 20, 1936

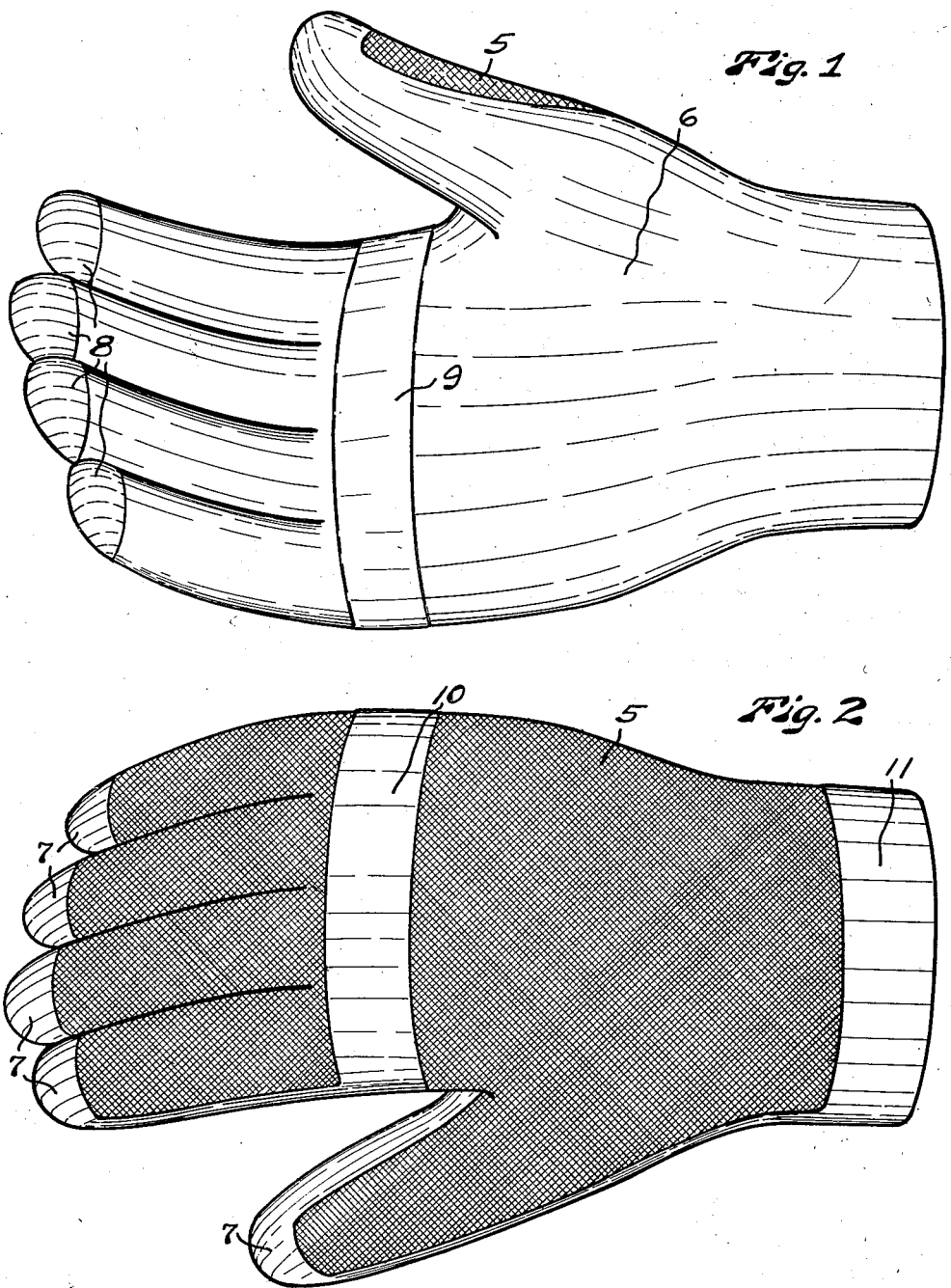

2,058,221

UNITED STATES PATENT OFFICE 2,058,221

HAND COVERING

Harry B. Ferguson, Seattle, Wash.

Application October 21, 1935, Serial No. 45,932

3 Claims. (Cl. 2—168)

This invention relates to hand coverings in the nature of gloves or mittens and the general object of this invention is to provide a hand covering in the form of a seamless knitted glove or mitten forming the foundation portion of the hand covering and having on the front side a facing of rubber securely vulcanized onto the foundation portion providing a very durable wearing surface especially adapted to withstand rough hard usage, the back of said hand covering being free from the rubber providing for ventilation and air circulation through the back, tending to prevent excessive perspiration of the hands and keep the glove or mitten dry on the inside.

Another object of this invention is to provide a hand covering of this nature in which the rubber is applied to a seamless knitted glove or mitten in a raw or semi-raw state and is then placed under pressure, preferably in a mold, and cured by the application of heat, thus causing the rubber to be forced into and impregnated in the fabric of the glove or mitten, thereby providing a very tough and wear resisting surface on parts which are subjected to hard wear.

Another object of this invention is to provide a rubber faced hand covering of this nature in which the rubber extends well around over the end of the finger tip portions to protect the same from wear and to provide a hand covering in which the palm parts where wear is greatest are most heavily reinforced with rubber.

Another object is to provide a seamless, knitted rubber faced hand covering of this type which has a strip of reinforcing rubber extending across the back at the location of the knuckles merging at both ends with the rubber on the face, said strip preventing the back of the hand covering from wearing out at the knuckles and providing transverse reinforcing means extending entirely around the knuckle portion of the hand covering tending to prevent wrinkling of the glove or mitten at the sides and providing a snugger fit.

Another object is to provide a seamless, knit, rubber faced glove or mitten of this type which is made on curved lines so that it will conform to the natural relaxed open position of the hand, said glove or mitten when in the open or relaxed position having a cupped palm portion in which there is no excess material to wrinkle when the glove is placed on the hand and the hand closed.

Other and more specific objects of the invention will be apparent from the following description taken in connection with the accompanying drawing.

I have shown and hereinafter described this invention as embodied in a glove but it will be understood that the same may be embodied in a mitten or like hand covering.

In the drawing Fig. 1 is a front or palm view of a glove constructed in accordance with this invention.

Fig. 2 is a back view of the same.

Fig. 3 is a fragmentary enlarged sectional view of the rubberized palm portion of the glove showing the way the rubber is impregnated into the knit foundation portion of the glove.

Like reference numerals designate like parts throughout the several views.

In the drawing 5, designates a seamless knitted glove having its entire front covered with a facing of cured and vulcanized rubber designated by 6. This rubber is allowed to extend up, over the ends of the fingers and thumb onto the back of the glove as indicated at 7 to protect the ends of the fingers and thumb from wear. The front of the glove fingers and thumb are also more heavily reinforced adjacent the ends as indicated at 8. An extra reinforcing strip 9 of rubber extends across the front of the glove at the base of the fingers providing excess reinforcing at this location of maximum wear. A strip 10 of rubber extends across the back of the glove at the location of the knuckles. This strip 10 is preferably a continuation of the reinforcing strip 9 or is otherwise connected with the rubber 6 on the palm portion of the glove so that it not only prevents the knuckle portion of the glove from wearing out but cooperates with the rubber facing to form a transverse rubber reinforcing extending entirely around the glove at this location providing a more snugly fitting glove and taking up excess slackness at the sides of the glove. A strip 11 of rubber is also provided across the wrist at the upper extremity of the glove and cooperates with the rubber facing on the front of the glove in providing elastic material extending entirely around the wrist portion of the glove. This assures a close fit for the wrist portion of the glove.

In making this glove the foundation portion is formed of seamless, relatively finely knit cotton which has a considerable amount of elasticity and is knit to a curvature corresponding to a relaxed position of the hand. This knit cotton glove is placed on a form and raw or non-cured rubber in plastic sheets or strips is placed on the palm portion and on the back portion at the locations shown. The glove with the raw plastic rubber thereon is then placed in a mold under pressure and subjected to a cooking or vulcanizing process by the application of heat. This pressure, in the presence of heat, forces the raw rubber into the interstices of the knit foundation material and the application of heat cures or vulcanizes the rubber so that it has wearing qualities corresponding to the wearing qualities of a pneumatic tire tread. The rubber is thus impregnated into the knit foundation material so firmly that it will not become loosened therefrom or peel off.

When the human hand is relaxed it naturally assumes a curved or cupped or partially closed position and when the hand is closed on an object this curved or cupped position is accentuated. I shape the foundation portion of the glove to conform to this curvature and vulcanize or cure the same to this shape. By thus curving or cupping the glove I reduce the area or amount of material required to form the palm of the glove. This provides a better and more comfortable fit, especially in a heavy glove, and minimizes the tendency to form wrinkles in the palm of the glove when the hand is closed.

The rubberized face of the glove is waterproof and forms a wearing surface which offers great resistance to wear, especially when rough materials are being handled. The glove is especially well adapted for the use of persons handling lumber as the rubber palm is highly resistant to penetration by splinters.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. A hand covering, comprising a foundation portion of seamless knit material; a rubber facing on the front of said foundation portion; a reinforcing rubber strip extending transversely across the palm of said rubber facing at the location of the base of the finger portion of said hand covering; and a rubber strip extending across the back of said foundation portion at the location of the knuckles merging with said reinforcing rubber strip at both ends and leaving the major portion of the back of said foundation portion free of rubber for ventilation purposes, said rubber facing and rubber strips being securely vulcanized to said foundation portion, said two rubber strips providing a reinforcing band extending entirely around said hand covering at the location of the knuckles.

2. A hand covering comprising a foundation portion of seamless knit material; a rubber facing on said foundation portion, the major portion of the back of said foundation portion being free of rubber providing for internal ventilation of the hand covering; and a rubber strip extending across the back of the wrist part of said foundation portion and merging with said rubber facing providing a snugly fitting elastic wrist for said hand covering, said rubber facing and said rubber strip being securely vulcanized to said foundation portion.

3. A hand covering comprising a foundation portion of seamless knit material; rubber facing on the front of said foundation portion; a rubber strip extending across the back of said foundation portion at the location of the knuckles merging with said rubber facing at both ends; and another rubber strip extending across the back of the wrist part of said foundation portion and merging with said rubber facing at both ends providing a snugly fitting elastic wrist for said hand covering, the major part of the back of said foundation portion being free of rubber providing for ventilation and said rubber facing and rubber strips being securely vulcanized to said foundation portion.

HARRY B. FERGUSON.